United States Patent
Bergman et al.

(10) Patent No.: US 10,611,978 B2
(45) Date of Patent: Apr. 7, 2020

(54) COOLING PROCESS OF TORREFIED BIOMASS

(71) Applicant: BLACKWOOD TECHNOLOGY BV, Hoofddorp (NL)

(72) Inventors: Peter Christiaan Albert Bergman, Callantsoog (NL); Maarten Kees Herrebrugh, Hoofddorp (NL); Timo Kleingeld, Hoofddorp (NL)

(73) Assignee: BLACKWOOD TECHNOLOGY BV (NL)

( * ) Notice: Subject to any disclaimer, the term of this patent is extended or adjusted under 35 U.S.C. 154(b) by 0 days.

(21) Appl. No.: 15/550,229

(22) PCT Filed: Feb. 11, 2016

(86) PCT No.: PCT/NL2016/050101
§ 371 (c)(1),
(2) Date: Aug. 10, 2017

(87) PCT Pub. No.: WO2016/130009
PCT Pub. Date: Aug. 18, 2016

(65) Prior Publication Data
US 2018/0273868 A1  Sep. 27, 2018

(30) Foreign Application Priority Data
Feb. 12, 2015 (NL) .................................... 2014279

(51) Int. Cl.
*C10L 9/08* (2006.01)
(52) U.S. Cl.
CPC ........... *C10L 9/083* (2013.01); *C10L 2290/06* (2013.01); *C10L 2290/24* (2013.01); *Y02E 50/15* (2013.01)

(58) Field of Classification Search
CPC ............. C10L 2290/06; C10L 2290/24; C10L 2290/083; C10L 9/083; Y02E 50/15
See application file for complete search history.

(56) References Cited

U.S. PATENT DOCUMENTS

| | | | |
|---|---|---|---|
| 2012/0023813 A1* | 2/2012 | Sethi ....................... | C10B 49/10 44/605 |
| 2012/0073159 A1* | 3/2012 | Weisselberg ............ | C10L 9/083 34/468 |
| 2014/0208995 A1* | 7/2014 | Olofsson ................ | F26B 23/022 110/222 |

FOREIGN PATENT DOCUMENTS

| | | |
|---|---|---|
| EP | 2589648 A1 | 5/2013 |
| GB | 2188916 A | 10/1987 |
| WO | 9916541 A1 | 4/1999 |
| WO | 2011119470 A1 | 9/2011 |

(Continued)

*Primary Examiner* — Latosha Hines
(74) *Attorney, Agent, or Firm* — Thomas|Horstemeyer, LLP

(57) ABSTRACT

The present invention relates to a process for cooling hot torrefied biomass, which process comprises the steps of a) applying water onto the hot torrefied biomass, resulting in steam with entrained dust and organic volatiles, and cooled torrefied biomass comprising water; b) condensing the steam with entrained dust and organic volatiles to form a condensate comprising dust and organic volatiles; and c) recycling the condensate comprising dust and organic volatiles to step a).

The invention also relates to a cooling device for cooling hot torrefied biomass enabling the cooling process according to the invention, and a system for producing torrefied biomass comprising such a cooling device.

12 Claims, 2 Drawing Sheets

(56) References Cited

FOREIGN PATENT DOCUMENTS

| | | |
|---|---|---|
| WO | 2012158111 A1 | 11/2012 |
| WO | 2012158112 A2 | 11/2012 |
| WO | 2013081510 A1 | 6/2013 |
| WO | 2015171865 A1 | 11/2015 |

* cited by examiner

COOLING PROCESS OF TORREFIED BIOMASS

CROSS-REFERENCE TO RELATED APPLICATION

This application is the National Stage of International Application No. PCT/NL2016/050101, filed 11 Feb. 2016, which claims the benefit of and priority to NL Application No. 2014279, having the title "Cooling Process Of Torrefied Biomass," filed on 12 Feb. 2015, the entire disclosures of which are incorporated by reference in their entireties as if fully set forth herein.

TECHNICAL FIELD

The present invention relates to a process for cooling hot torrefied biomass, a process for the preparation of torrefied biomass, a device for cooling hot torrefied biomass, and a system for the production of torrefied biomass.

BACKGROUND

In a torrefaction process, biomass is heated during which biomass properties are changed to obtain a much better fuel quality for combustion and gasification applications. Biomass is present in biodegradable industrial and domestic waste such as e.g. agricultural waste, wood chippings, mowed grass and even municipal solid waste, and is widely viewed of as a good alternative for fossil fuels.

Unfortunately the current energy infrastructure is based on coal fired plants, and biomass currently cannot be fired or even co-fired in such plants, because the properties of biomass differ significantly from those of coal. For example, biomass tends to be difficult to pulverize and its energy density is typically substantially lower than the energy density of coal. The latter also makes logistics and storage of biomass relatively expensive.

In order to co-fire biomass in existing coal-fired plants, the biomass can be treated to alter its properties to be more coal-like. Torrefaction is a thermal pre-treatment method for biomass which can be applied to all kinds of biomass. During the torrefaction process, the biomass is usually heated under atmospheric pressure to temperatures of about 200-320° C. in the substantial absence of oxygen. The oxygen depletion prevents combustion of the biomass, while at the same time the high temperature leads to the removal of water and volatile organic compounds from the biomass. After the process, the biomass has decreased in weight by up to 30%, whilst the energy value has only been reduced by e.g. 10%. Thus, a product with a higher calorific value is achieved.

Torrefaction drives moisture, and oxygen- and hydrogen rich functional groups from the crude biomass. As a result, the properties of torrefied biomass are very similar irrespective of the source of the crude biomass. Furthermore, torrefaction eliminates any biological activity, so that biological decomposition like rotting does not occur. Torrefaction also eliminates the risk of spontaneous combustion. The resulting torrefied materials are more brittle, leading to better grindability, and the torrefied biomass is also hydrophobic, which makes storage in open air feasible. Several modes exist for torrefying biomass. For example, the biomass can be heated in a compact moving bed reactor, a belt dryer, a rotating drum, or a fluidized bed reactor.

After torrefaction, the biomass should be cooled to decrease the temperature from reactor conditions (200 to 320° C.) to below 100° C. This stops the decomposition reactions that torrefaction represents and conditions the torrefied product for further upgrading such as milling and densification. A potential hazard that can occur when cooled torrefied biomass is exposed to air is spontaneous ignition. Especially when the particles are still hot (>50° C.) and bone dry.

Direct cooling of the product with water is a very effective manner to reduce the temperature quickly and add a significant amount of moisture. This method yields a high cooling rate of the product particles, which is attractive to freeze the decomposition reactions and reduce volatile emissions from the particles in the cooler or even further downstream. It also eliminates fire hazards.

Such a cooling process comprising a step of applying water onto the hot torrefied biomass is known from WO2012158112-A2, for example. Water is applied to the torrefied material to quench-cool the material, after which both the torrefied material and the gases that are released during cooling are fed to a common cooling device for further cooling the torrefied material together with these gasses. In this way components of these gases condense in the cooling device, e.g. on the torrefied material.

The same principle is applied in the cooling step of US20140208995-A1. In an embodiment of US20140208995-A1 biomass exits a torrefaction reactor via a biomass outlet and is thereafter quench cooled in a water application device. The torrefied material that has passed the water application device is fed to a screw cooler for further cooling the torrefied material together with torrefaction gases such that part of the components of the torrefaction gases condense in the screw cooler. Non-condensed components are sucked out of the cooling screw by means of a fan and transferred back to the biomass outlet. Only the initial application of water provides for fast cooling. The temperature during this initial cooling step is however not reduced below 120° C. The further cooling process in the screw cooler is much slower.

WO2012158111-A1 describes a cooling process for torrefied biomass, in which hot torrefied biomass is transported through a cooled drum by means of a screw. At least a part of the cooled torrefied material is mixed-back with hot torrefied material during cooling. In this way, gasses given off by the hot material will condense on the cold torrefied material. This decreases clogging of the device, increases the energy yield of the final torrefied product, and increases the hydrophobicity of the final torrefied product. Only the initial application of water provides for fast cooling. The cooling process in the common cooling device is much slower.

WO2013081510-A1 describes cooling of torrefied material by adding water. A cyclonic separator to separate the steam and torrefied material is disclosed. After this separation step, the steam is condensed for recovery of heat.

EP2589648-A1 discloses a process for the torrefaction of biomass, in which processed biomass is cooled by spraying water onto the product. EP2589648-A1 specifically mentions not raising the moisture content of the cooled product above approximately 3 weight percent.

WO2011119470-A1 also discloses cooling of hot torrefied biomass by a water spray. It furthermore discloses conditioning the biomass to a moisture content of 5 to approximately 15% for lubrication purposes during densification.

In US 2012/0073159 A1, cellulosic material is cascaded from top to bottom between a plurality of rotatable trays vertically stacked within multiple processing zones of an apparatus. The hot torrefied cellulosic material is wiped off the bottom tray into a volume of water. In an embodiment exhaust gases are condensed, and water and other condensables are removed through an outlet. The remaining exhaust gases are provided to a burner and heat exchanger before they are vented.

SUMMARY

Now it has been observed that when torrefied biomass is cooled in a mixer vessel using water sprays, that the formed steam besides organic volatiles is never free of dust. This combination of steam, volatiles, and dust makes the treatment of the steam not straightforward and even problematic. Especially the steam condensation involves fouling by the deposition of dust and equipment can readily block when the condensation process is not facilitated correctly. In turn, this can lead to product loss due to loss of dust, and to a high maintenance and a low uptime characteristic correspondingly.

Generally the invention aims at the reduction and/or elimination of one or more of the above disadvantages related to the cooling of hot torrefied biomass.

According to the invention, the process for cooling hot torrefied biomass comprising a step a) of applying water onto the hot torrefied biomass therefore further comprises the steps of b) condensing the steam with entrained dust and organic volatiles to form a condensate comprising dust and organic volatiles, and c) recycling the condensate comprising dust and organic volatiles to step a). By condensing the steam and recycling the condensate comprising dust and organic volatiles, the water and dust mixture are not separated, but instead the mixture is applied onto the hot biomass. As a result the biomass is cooled. In this way, the dust and organic volatiles are collected and reused as valuable product. Also the water usage is reduced due to the recycling of water. This way of integrating furthermore prevents the need for a water/dust separator such as a filter or decanter.

In step b) extra water is preferably added to the process. This extra water compensates for water that is absorbed by the biomass and therefore lost from the recycle loop. Step b) may take place in a condensation device such as a condenser. As previously stated, especially the steam condensation involves fouling. Equipment can readily block when the condensation process is not facilitated correctly. This can lead to severe fouling, product loss due to loss of dust, and to a high maintenance and a low uptime characteristic correspondingly. The addition of water in this particular step of the process has the advantage that the steam with entrained dust and organic volatiles is diluted by the water. This reduces fouling and minimizes the accompanying disadvantages. Furthermore, a cause of the high degree of fouling involved with the steam/dust mixture in condensation is the ratio of water to dust. A low ratio causes the mixture of condensate and dust/organics to be a sticky viscous substance, which attaches to the inner walls of equipment, such as the condenser. A higher ratio of water to dust surprisingly prevents the formation of this sticky viscous substance. Therefore, a high ratio of water to dust is advantageous.

The water is preferably sprayed onto the hot biomass in step a). Spraying results in an even distribution of water on the biomass. Thereby it results in an even cooling.

The biomass can be heated using several methods. Commonly, heating takes place in compact moving bed reactors, belt dryers, rotating drums, and fluidized bed reactors, amongst others. A fluidized bed reactor is particularly advantageous. In such a reactor, the biomass is brought into contact with a hot gas, by which it is fluidized. As a result, the heat transfer between the biomass and the hot gas is particularly good.

Preferably, the fluidized bed reactor is a toroidal bed reactor. A toroidal bed reactor is provided with an annular treatment chamber which defines a substantially vertical axis, which treatment chamber comprises a supply for biomass particles, a discharge for biomass particles and a bottom, which bottom is provided with supply openings which debouch upwards into the treatment chamber, preferably obliquely with respect to the vertical axis in which a hot gas is supplied to the supply openings for forming a fluidized bed of biomass particles on the bottom which is displaced in the peripheral direction of the annular treatment chamber. Such a toroidal bed reactor is known, for example, from WO99/16541. When using a toroidal bed reactor as a heating device, the heat transfer between the supplied hot gas and the biomass is particularly good.

The hot torrefied biomass preferably is a particulate material. Heat transfer to particulate material is more efficient than heat transfer to material of larger size, as the inside of particulate material heats faster. Preferably, the particles have a size less than 16 mm. In larger particles, the heat transfer is not efficient enough. Also, larger particles cannot be efficiently fluidized. More preferably, the particles have a size less than 8 mm. The heat transfer is even more efficient than for larger particles, and when a fluidized or toroidal bed reactor is used for heating, the gas flow needed for fluidization can be decreased compared to larger particles. Even more preferably, the particles have a size less than 4 mm. This provides for an optimal balance between heat transfer and fluidization.

The invention also provides for a process for the preparation of biomass, which process comprises the steps of i) supplying wet biomass; ii) drying the wet biomass to form dried biomass; iii) heating the dried biomass to form hot torrefied biomass; and iv) cooling the hot torrefied biomass using the process for cooling hot torrefied biomass as previously described. This process removes excess moisture and high-volatiles from the biomass and provides for the production of cooled biomass with a calorific value suitable for co-firing in coal-fired plants.

The process for preparation of biomass further comprises the step of v) pelletizing the cooled torrefied biomass containing water. Pelletization densifies the material, such that storage and transport become more efficient. Handling of pelletized material is also easier than handling particulate material.

The examples, advantageous and preferred embodiments presented above regarding the process for cooling hot torrefied biomass are equally applicable to the process for preparation of biomass and further aspects of the invention described below.

The invention furthermore provides for a device for cooling hot biomass, comprising a housing defining a cooling chamber, and having a biomass inlet for supplying hot torrefied biomass into the cooling chamber, a biomass outlet for discharging cooled torrefied biomass comprising water from the cooling chamber, a water inlet for introducing water into the cooling chamber, a steam outlet for removing steam with entrained dust and organic volatiles from the cooling chamber; a condenser for condensing steam, having a steam inlet for feeding steam with entrained dust and organic volatiles into the condenser, a condensate outlet for removing condensate comprising dust and organic volatiles from the condenser, wherein the condensate outlet is connected to the water inlet for introducing water into the cooling chamber, and wherein the steam inlet is connected to the outlet for removing steam from the cooling chamber.

In the device for cooling hot biomass, the condenser advantageously has a water inlet for feeding fresh water into the condenser.

In an embodiment of the device for cooling hot biomass, the water inlet for introducing water into the cooling chamber is connected to spray nozzles positioned in the cooling chamber.

The invention provides for a system for producing torrefied biomass, comprising a drying zone, comprising an inlet for wet biomass, and an outlet for dried biomass; a torrefaction zone, comprising an inlet for dried biomass, which connects to the outlet for dried biomass of the drying zone, and an outlet for hot torrefied biomass; and a cooling zone comprising a device for cooling hot biomass, further comprising an inlet for hot torrefied biomass, which connects to the outlet for hot torrefied biomass of the torrefaction zone, and an outlet for discharging cooled biomass comprising water.

The system for producing torrefied biomass further comprises a pelletizing zone, comprising an inlet for cooled torrefied biomass comprising water, which connects to the outlet for cooled torrefied biomass comprising water of the cooling zone, and an outlet for pelletized biomass.

In the system for producing torrefied biomass, the torrefaction zone comprises at least a fluidized bed reactor.

Preferably, the fluidized bed reactor in the system for producing torrefied biomass is a toroidal bed reactor.

The torrefaction zone in the system for producing torrefied biomass may further comprise a plug flow reactor. In such a case, the torrefaction zone consists of at least one or multiple fluidized bed reactors, which may be toroidal bed reactors, and one or multiple plug flow reactors. In such a configuration, the advantageous characteristics of both types of reactors are optimally used. The fluidized bed reactor has excellent heat transfer capabilities, but provides for relatively short residence times. The fluidized bed reactor can therefore be used to quickly heat the biomass to a desired temperature during a first time period. The biomass may then be directly or indirectly transferred to the plug flow reactor(s). Plug flow reactors provide for larger volumes and longer residence times, and are therefore well suited to maintain the biomass at a certain torrefaction temperature for a certain second time period, which time period is preferably longer than the first time period, until the biomass is torrefied to a satisfactory level.

BRIEF DESCRIPTION OF THE DRAWINGS

The invention is further illustrated by means of the attached drawing, wherein.

DETAILED DESCRIPTION

Figure 1:
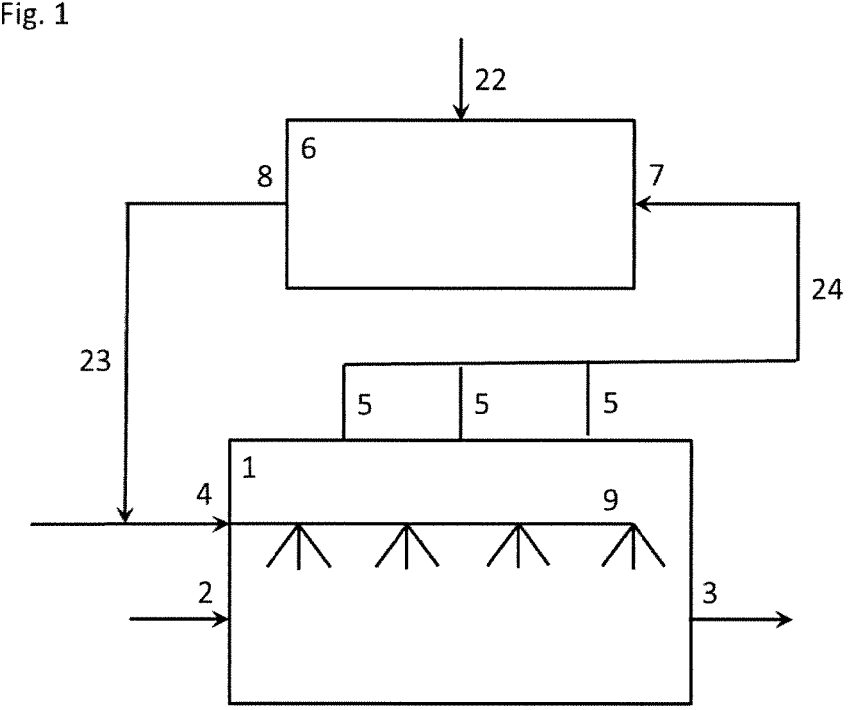
FIG. 1 is a schematic view of an embodiment of a device for cooling hot torrefied biomass.

FIG. 1 provides a schematic view of a device for cooling hot torrefied biomass. It comprises a housing defining a cooling chamber 1. This housing has a biomass inlet 2 for supplying hot torrefied biomass into the cooling chamber, and a biomass outlet 3 for discharging cooled torrefied biomass comprising water from the cooling chamber. The housing further comprises a water inlet 4 for introducing water into the cooling chamber, and a steam outlet 5 for removing steam with entrained dust and organic volatiles from the cooling chamber. In this embodiment, he water inlet 4 is connected to spray nozzles 9 positioned in the cooling chamber. The device for cooling hot biomass further comprises a condenser 6 for condensing steam. This condenser has a steam inlet 7 for feeding steam with entrained dust and organic volatiles into the condenser 6, and a condensate outlet 8 for removing condensate comprising dust and organic volatiles from the condenser 6. In this embodiment, the condenser has a water inlet 22 for feeding fresh water into the condenser. Within the condenser, both direct cooling of the biomass with water as well as indirect cooling may happen simultaneously. Indirect cooling may e.g. take place by contacting the biomass with a cold water-fed piping system in which water is continuously flowed. The water stream in the latter piping system is preferably not connected to the water supply that comes into contact with the biomass. The condensate outlet 8 is connected to the water inlet 4 for introducing water into the cooling chamber 1 via conduit 23. The steam inlet 7 is connected to the outlet 5 via outlets 25 for removing steam from the cooling chamber 1 and conduit 24.

Figure 2:
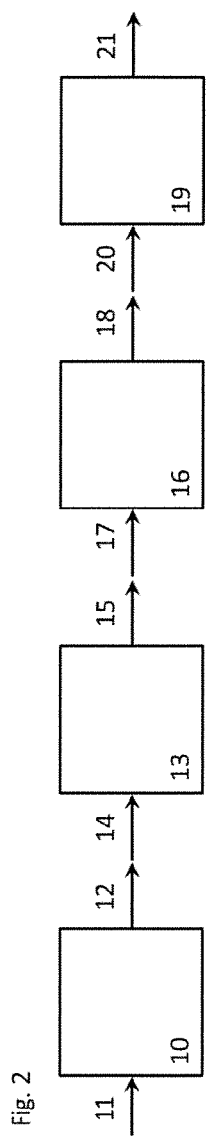
FIG. 2 is a schematic view of an embodiment of a system for producing torrefied biomass.

FIG. 2 provides a schematic view of a system for producing torrefied biomass. The system comprises a drying zone 10. This drying zone comprises an inlet for wet biomass 11, and an outlet for dried biomass 12. The system further comprises a torrefaction zone 13, which comprises an inlet for dried biomass 14, connecting to the outlet for dried biomass 12 of the drying zone, and an outlet for hot torrefied biomass 15. The system also comprises a cooling zone 16 comprising a cooling device, further comprising an inlet for hot torrefied biomass 17, which connects to the outlet for hot torrefied biomass 15 of the torrefaction zone, and an outlet for discharging cooled biomass comprising water 18. The system may further comprise a pelletizing zone 19. This pelletizing zone comprises an inlet for cooled torrefied biomass comprising water 20. This inlet connects to the outlet for cooled torrefied biomass comprising water 18 of the cooling zone. The pelletizing zone further comprises an outlet for pelletized biomass 21.

In a typical process, biomass is dried in the drying zone 10 to reduce the moisture content to 5-20%, after which it is transported, for example using a conveyor belt, to the torrefaction zone 13. In the torrefaction zone, the dried biomass is torrefied at elevated temperatures.

In this exemplary embodiment, the torrefaction zone consists of multiple treatment devices. The first treatment device is configured as a so-called toroidal bed reactor. In the toroidal bed reactor, the biomass is quickly (within about 2 min.) heated to a temperature of 200-320° C. within a first time period. The biomass is then transported to a second treatment device, which is configured according to the principle of a plug flow reactor. This reactor provides for treatment at comparable temperatures but for a longer period. The second time period is long enough for all biomass particles to be thoroughly heated, thus ensuring that all biomass particles are sufficiently torrefied.

After torrefaction, the torrefied biomass is transported to the cooling zone 16, which comprises a device for cooling hot torrefied biomass. This device comprises a housing defining a cooling chamber 1. The biomass is transported through biomass inlet 2 into cooling chamber 1. Water is sprayed onto the biomass through nozzles 9, resulting in steam with entrained dust and organic volatiles, from now on called dirty steam, and cooled biomass comprising water. The cooled biomass comprising water is transported out of the cooling chamber through outlet 3. The dirty steam leaves the cooling chamber through outlets 5. Through conduit 24, this steam is transported to the inlet 7 of the condenser. In the condenser, the dirty steam is condensed to form water with entrained dust and organic volatiles. Fresh water is added through inlet 22. Uncondensed dirty steam may leave the condenser through an outlet for dirty steam (not shown in the drawings). The water with entrained dust, organic volatiles, and added fresh water leaves the condenser through outlet 8, and is transported into the spray nozzles 9 in the cooling chamber through inlet 4.

The cooled torrefied biomass may then be transported to a pelletizing zone 21.

The invention claimed is:

1. Process for cooling hot torrefied biomass, which process comprises the steps of
   a) applying water onto the hot torrefied biomass with a temperature of between 200-320° C., resulting in steam with entrained dust and organic volatiles, and torrefied biomass cooled below 100° C. comprising water;
   b) condensing the steam with entrained dust and organic volatiles to form a condensate comprising dust and organic volatiles; and,
   c) recycling the condensate comprising dust and organic volatiles to step a), wherein in step b) fresh water is added to the steam with entrained dust and organic volatiles.

2. Process according to claim 1, wherein in step a) the water is sprayed onto the hot torrefied biomass.

3. Process according to claim 2, wherein the hot torrefied biomass is cooled in a mixer vessel.

4. Process according to claim 1, in which the cooled torrefied biomass resulting from step a) has a water content of at least 3% by volume.

5. Process according to claim 1, in which the hot torrefied biomass has been heated in a fluidized bed reactor.

6. Process according to claim 5, in which the fluidized bed reactor is a toroidal bed reactor.

7. Process according to claim 1, in which the hot torrefied biomass is a particulate material having a particle size less than 16 mm.

8. Process according to claim 1, further comprising the steps of
   i) supplying wet biomass;
   ii) drying the wet biomass to form dried biomass; and
   iii) heating the dried biomass to form the hot torrefied biomass.

9. Process according to claim 8, further comprising the step of
   iv) pelletizing the cooled hot torrefied biomass containing water.

10. Process according to claim 3, in which the cooled torrefied biomass resulting from step a) has a water content of at least 3% by volume.

11. Process according to claim 7, in which the particulate material has a particle size of less than 8 mm.

12. Process according to claim 7, in which the particulate material has a particle size of less than 4 mm.

* * * * *